United States Patent
Pekarsky et al.

(10) Patent No.: US 10,125,889 B2
(45) Date of Patent: Nov. 13, 2018

(54) SOLENOID VALVE DIVERTER SLEEVE

(71) Applicant: Ford Global Technologies, LLC, Dearborn, MI (US)

(72) Inventors: Lev Pekarsky, West Bloomfield, MI (US); Robert O. Burkhart, Novi, MI (US); Boya Zhang, Ann Arbor, MI (US); Ravindra Velamakanni, Saline, MI (US); Daniel Smokovitz, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 84 days.

(21) Appl. No.: 15/254,058

(22) Filed: Sep. 1, 2016

(65) Prior Publication Data

US 2018/0058605 A1    Mar. 1, 2018

(51) Int. Cl.
    *F16K 1/38*    (2006.01)
    *F16K 31/06*   (2006.01)
    *F16K 27/02*   (2006.01)
    *F16K 15/18*   (2006.01)

(52) U.S. Cl.
    CPC .......... *F16K 31/0665* (2013.01); *F16K 1/38* (2013.01); *F16K 15/183* (2013.01); *F16K 27/029* (2013.01); *F16K 27/0245* (2013.01); *Y10T 137/794* (2015.04); *Y10T 137/7976* (2015.04)

(58) Field of Classification Search
    CPC .. F16K 47/08; F15D 1/02; F15D 1/025; F16L 55/02736; Y10T 137/794; Y10T 137/86622; Y10T 137/86734; Y10T 137/87217; Y10T 137/87539
    USPC .......... 137/544, 596.17, 601.18; 138/42, 43; 251/118, 120, 122, 127, 129.15
    See application file for complete search history.

(56) References Cited

U.S. PATENT DOCUMENTS

| | | | | |
|---|---|---|---|---|
| 4,270,571 A | * | 6/1981 | Pauliukonis | F16K 47/04 137/614.11 |
| 5,042,448 A | * | 8/1991 | Cook | F02M 3/075 123/339.28 |
| 6,068,237 A | | 5/2000 | Holmes et al. | |
| 8,127,791 B2 | | 3/2012 | Najmolhoda et al. | |
| 8,733,393 B2 | * | 5/2014 | Najmolhoda | F16K 31/062 137/544 |
| 8,733,395 B2 | * | 5/2014 | Najmolhoda | F16K 31/062 137/596.17 |
| 2013/0048106 A1 | * | 2/2013 | Lee | F01L 13/00 137/492.5 |
| 2015/0144820 A1 | | 5/2015 | Mills et al. | |

* cited by examiner

*Primary Examiner* — Matthew W Jellett
(74) *Attorney, Agent, or Firm* — Brooks Kushman P.C.

(57) ABSTRACT

A solenoid valve includes a support bushing and an armature pin axially movable within the support bushing. The solenoid shield further includes a valve rigidly secured to the armature pin. The valve includes a diverter sleeve having an overlap portion that is radially spaced from at least a portion of the support bushing and extends along a length of at least a portion of the support bushing. The diverter sleeve further includes a deflector surface disposed at an angle relative to a longitudinal axis of the armature pin.

19 Claims, 3 Drawing Sheets

US 10,125,889 B2

SOLENOID VALVE DIVERTER SLEEVE

TECHNICAL FIELD

This disclosure relates to a solenoid valve for use in hydraulic controls. More specifically, this disclosure relates to a variable bleed solenoid having a contaminant diverter sleeve.

BACKGROUND

Solenoid valves are electro-hydraulic valves that are used to control fluid flow. Solenoid valves are often used, for example, to control pressure of hydraulic fluid in an automatic transmission of an automobile.

Various types of solenoid valves may be used depending on the environment and the purpose of the solenoid valve. One type of solenoid valve is a variable bleed solenoid. Variable bleed solenoids have significant bleed flow throughout most of their pressure range. This flow typically includes contaminants such as metal powder worn from the moving parts, or ferrous debris or general dust in the transmission. Such contaminants can adversely affect the performance of a solenoid if allowed to reach the inner mechanisms of the solenoid. For example, contaminant buildup may restrict armature movement, alter pressure, or alter magnet characteristics within the solenoid.

SUMMARY

A solenoid valve includes a support bushing and an armature pin axially movable within the support bushing. The solenoid shield further includes a valve rigidly secured to the armature pin. The valve includes a diverter sleeve having an overlap portion that is radially spaced from at least a portion of the support bushing and extends along a length of at least a portion of the support bushing. The diverter sleeve further includes a deflector surface disposed at an angle relative to a longitudinal axis of the armature pin.

In one approach, the diverter sleeve is a discrete member rigidly secured to the valve. In another aspect, the diverter sleeve is integrally formed with the valve. The valve and the diverter sleeve are preferable axially movable with respect to the support bushing.

In one approach, the overlap portion of the diverter sleeve has an inner diameter greater than an outer diameter of at least a portion of the support bushing. The overlap portion of the diverter sleeve preferably overlaps at least a portion of the support bushing around an entire circumference of the support bushing.

In one approach, the deflector surface extends at an angle generally toward an exhaust port of the solenoid valve. The angle may be, for example, in a range of 30°-60° relative to a longitudinal axis of the armature pin. In some approaches, the deflector surface is exposed in a flow path of a hydraulic fluid to deflect flow of the hydraulic fluid.

DETAILED DESCRIPTION

Figure 1:
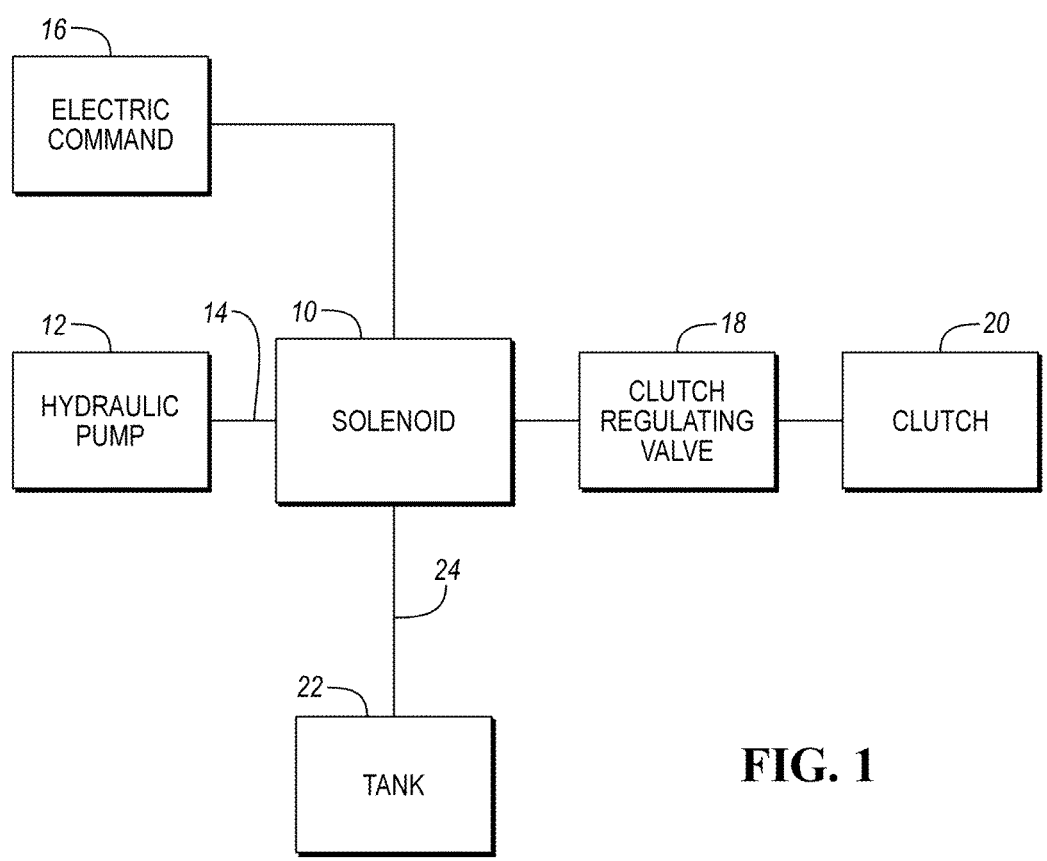
FIG. 1 is a schematic diagram of a hydraulic circuit in a transmission.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. It should be understood that throughout the description, corresponding reference numerals indicate like or corresponding parts and features.

Referring now to FIG. 1, a solenoid 10 is operatively connected to a hydraulic pump 12. The hydraulic pump 12 provides hydraulic fluid, such as oil, to the solenoid 10 via a supply port 14.

The solenoid 10 may be a pressure control or regulating valve. The solenoid 10 is preferably a variable bleed solenoid (VBS), although it will be appreciated that other types of solenoids may be use. The VBS solenoid 10 may be, for example, an electromagnetically-controlled low leak three port pressure regulator. The solenoid 10 is adjusted from a first configuration to a second configuration (e.g., a closed configuration to an open configuration or vice versa) in response to receiving an electric input from an electric command module 16.

The solenoid 10 controls pressure of fluid provided to a clutch regulating valve 18, which in turn controls a clutch 20. Fluid not provided by the solenoid 10 to the clutch regulating valve 18 is discharged to a tank 22 through an exhaust line 24.

Figure 2:
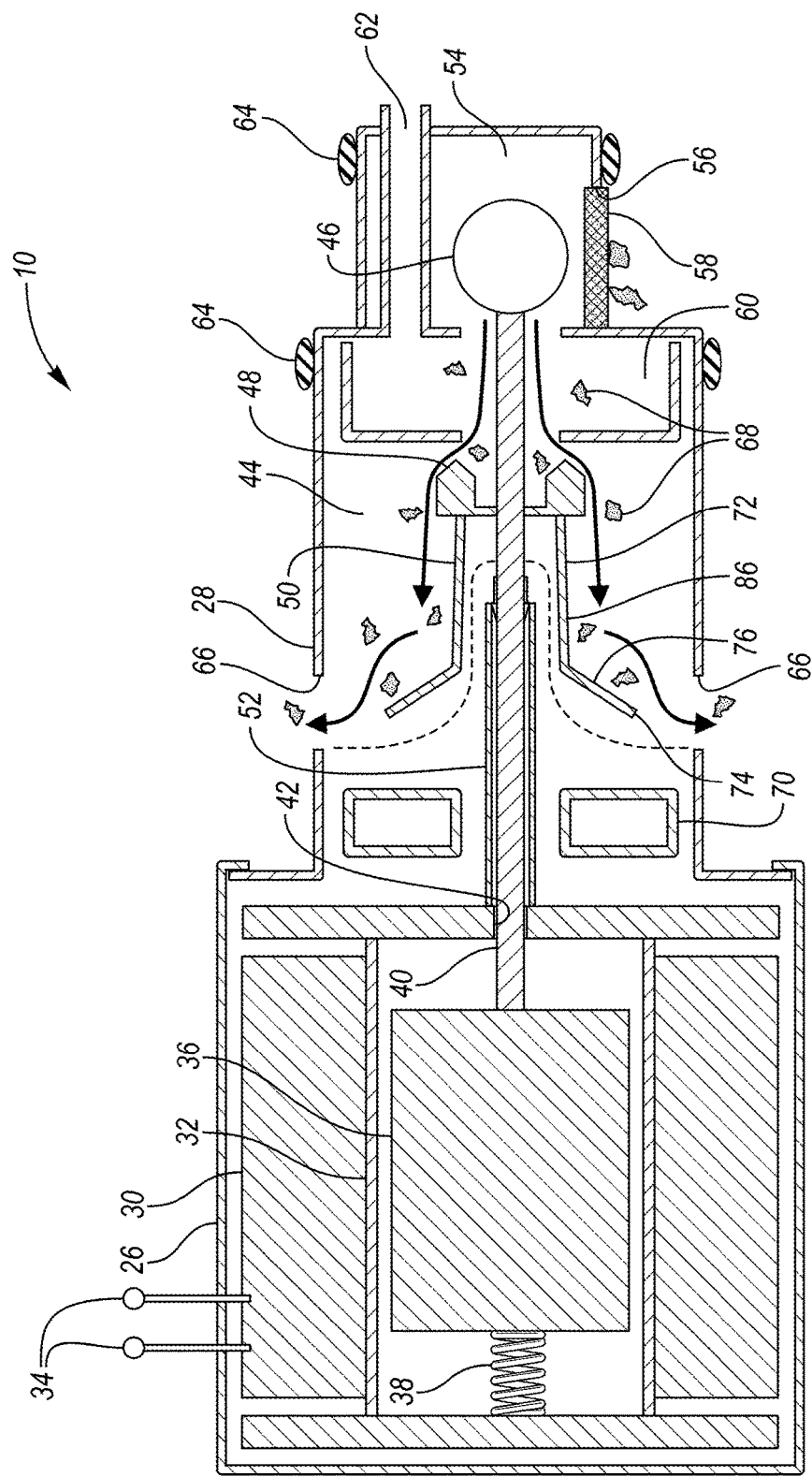
FIG. 2 is a schematic diagram of a cross-sectional view of a variable bleed solenoid valve.

Referring now to FIG. 2, the solenoid 10 includes a can housing 26 connected to a nozzle 28. The can housing 26 may be formed of steel or any other suitable material. The nozzle 28 may be formed of plastic or any other suitable material. The can housing 26 may be connected to the nozzle 28, for example, by crimping an end portion of the can housing 26 about and an end portion of the nozzle 28.

Disposed within the can housing 26 is an electromagnetic coil 30 wound around a bobbin 32. The electromagnetic coil 30 receives an electric current at an input 34. An axially movable armature 36 is disposed within the bobbin 32. The armature 36 preferably has an iron core. When electric current flows through the electromagnetic coil 30, a resulting magnetic field causes the armature 36 to axially move within the bobbin 32. The solenoid 10 further includes a spring 38 that allows the armature 36 to return to its original position when the solenoid 10 is deactivated and the magnetic charge is released.

An armature pushpin 40 is connected to the armature 36 and extends through an aperture 42 in the bobbin 32 and into an exhaust chamber 44 of the solenoid 10. In one aspect, the armature pushpin 40 is a one-piece armature pushpin. In another aspect (not shown), the armature pushpin includes an intermediate dowel positioned between the armature pushpin and the armature.

At an end of the armature pushpin 40 opposite the armature 36 is a ball check valve 46. The ball check valve 46 may be, for example, a 1.5 millimeter diameter ball check valve 46. A valve, such as a poppet valve 48, is rigidly attached to the armature pushpin 40 at an axial location between the ball check valve 46 and the aperture 42 of the bobbin 32. As discussed in greater detail elsewhere herein, a flow diverter sleeve 50 extends from the poppet valve 48.

A support bushing 52 is connected to the bobbin 32 adjacent the aperture 42 and extends into the exhaust chamber 44 of the nozzle 28. The support bushing 52 is coaxial with the armature pushpin 40 and surrounds the armature pushpin 40 about a circumference of the armature pushpin 40. In this way, the support bushing 52 is capable of maintaining the armature pushpin 40 in proper axial alignment. The support bushing 52 is preferably formed from copper or brass.

An inner surface of the support bushing 52 is preferably radially spaced from an outer surface of the armature pushpin 40 to provide an air gap between the support bushing 52 and the armature pushpin 40. The air gap allows lubricating fluid to circulate through the support bushing 52 during to provide free movement of the armature pushpin 40 within the support bushing 52.

The ball check valve 46 is disposed in a fluid inlet chamber 54 of the nozzle 28. The fluid inlet chamber 54 includes an inlet port 56 adapted to receive hydraulic fluid from the hydraulic pump 12 via the supply port 14. A filter 58, such as a 120 micron filter, is disposed across the inlet port 56 to inhibit contaminants contained in the hydraulic fluid from entering the solenoid 10.

The solenoid 10 further includes an intermediate hydraulic chamber 60 in fluid communication with a regulated (or controlled) pressure passage 62. One or more seal rings 64 may be provided on an exterior of the nozzle 28 to maintain the nozzle 28 in proper alignment.

Depending on the axial position of the armature 36, the ball check valve 46 allows the intermediate hydraulic chamber 60 to be in fluid communication with the fluid inlet chamber 54. Also depending on the axial position of the armature 36, the poppet valve 48 allows the intermediate hydraulic chamber 60 to be in fluid communication with the exhaust chamber 44.

The exhaust chamber 44 includes one or more fluid exhaust ports 66. The fluid exhaust ports 66 permit flow of the hydraulic fluid from the exhaust chamber 44 to a tank 22 through an exhaust line 24.

Control of hydraulic fluid flow through the various chambers and passages of the solenoid 10 is well-known and is not discussed in great detail for the sake of brevity.

In many approaches, it may be advantageous to permit hydraulic fluid to enter and pass through the air gap between the support bushing 52 and the armature pushpin 40. In this way, recirculating hydraulic fluid (indicated by the dashed lines in FIG. 2) provides lubrication to promote free movement of the armature 36 and armature pushpin 40 within the solenoid 10.

Hydraulic fluid typically carries contaminants 68 that can adversely affect the performance of the solenoid 10. Larger contaminants (typically greater than 100 μm) are prevented from entering the solenoid 10 at the filter 58. It has been found, however, that debris smaller than 25 μm can pass through the filter 58 and degrade performance of the solenoid 10. Although filters may be provided with ultra-fine mesh sizes, such filters have been found to cause excessive flow resistance at low temperatures.

Another approach for preventing contaminants from adversely affecting the performance of the solenoid 10 is to provide one or more magnets 70 in the flow of the hydraulic fluid. Magnets 70 have been found to attract some contaminants that are in close proximity with a magnet pole. However, depending on flow velocity and distance from the magnet 70, many contaminants can freely flow within the solenoid 10.

Another approach for preventing contaminants in a hydraulic fluid flow from adversely affecting performance of the solenoid 10 is provided herein. In this approach, the solenoid 10 includes a flow diverter sleeve 50 extending from the poppet valve 48. The poppet valve 48 is preferably rigidly secured to the armature pushpin 40 at connection point at an axial location along the armature pushpin 40 between the hydraulic chamber 60 and the support bushing 52. The connection point is preferably sufficiently axially spaced from the armature pushpin 40 to permit uninterrupted stroke movement of the armature pushpin 40.

In one aspect, shown in FIG. 2, the flow diverter sleeve 50 and the poppet valve 48 are discrete members rigidly secured to one another. In another aspect, shown in FIG. 3, the flow diverter sleeve 50' and the poppet valve 48 are an integrally formed, one-piece member. The flow diverter sleeve 50, 50' may be formed of any suitable material, including, for example, stainless steel, brass, copper, or ceramic.

The flow diverter sleeve 50, 50' may be provided with various internal and external geometries that permit the flow diverter sleeve to shield the support bushing 52 from direct exposure to a flow of hydraulic fluid. In the approach shown in FIG. 2, the flow diverter sleeve 50 has a generally cylindrical body 72 and a flange region 74 that extends from the body 72. At least a portion of the body 72 and/or the flange region 74 surrounds at least an end portion of the support bushing 52, preferably, about the entire circumference of the support bushing 52. In this way, the flow diverter sleeve 50 shields the end portion of the support bushing 52 from being directly exposed to the exhaust chamber 44. The overlapping portion 86 of the flow diverter sleeve 50 is preferably radially spaced from the support bushing to provide an air jacket between an outer circumference of the flow diverter sleeve 50 and an inner circumference of the support bushing 52. Recirculating fluid is thereby permitted to pass through the air jacket formed between the flow diverter sleeve 50 and the support bushing 52, and subsequently permitted to pass through the air gap formed between the support bushing 52 and the armature pushpin 40.

Figure 3:
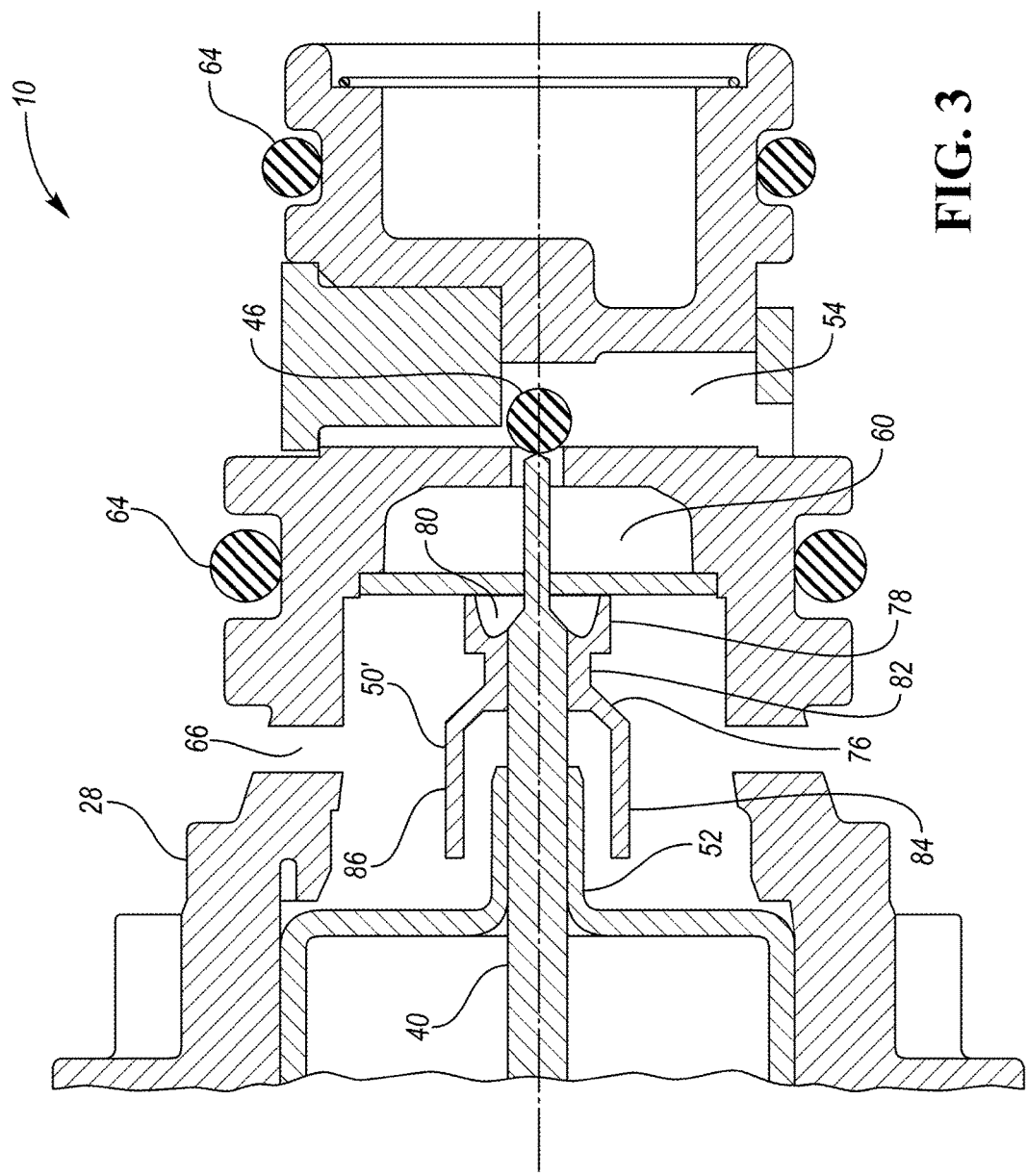
FIG. 3 is a cross-sectional view of a variable bleed solenoid valve.

In the approach shown in FIG. 3, the valve is a one-piece valve having a flow diverter sleeve 50' extending over at least an end portion of the support bushing 52. In this approach, the flow diverter sleeve 50' is provided with an hourglass shape having a first outer diameter at a first region 78 adjacent the hydraulic chamber 60. The first region 78 is preferably a valve region that operates as a poppet valve in controlling flow of hydraulic fluid from the hydraulic chamber 62 to the exhaust chamber 44. The first region 78 may define an inner cup region 80 capable of deflecting flow from the hydraulic chamber 60 to provide a fountain effect of incoming hydraulic flow. The flow diverter sleeve 50' has a second outer diameter at a second region 82 adjacent the first region 78, and a third outer diameter at a third region 84 adjacent the second region. The third outer diameter is greater than the second outer diameter.

The third region 84 is dimensioned such that at least a portion of the third region 84 overlaps at least a portion of the support bushing 52. In this way, the third region is dimensioned to have an inner diameter greater than the outer diameter of at least the end portion of the support bushing 52. This overlapping portion 86 of the third region 84 preferably surrounds the entire circumference of the support bushing 52 and operates as a shield region that shields the end portion of the support bushing 52 from being directly exposed to the exhaust chamber 44. The overlapping portion of the flow diverter sleeve 50' is preferably radially spaced from the support bushing to provide an air jacket between an outer circumference of the flow diverter sleeve 50' and an inner circumference of the support bushing 52. Recirculating fluid is thereby permitted to pass through the air jacket formed between the flow diverter sleeve 50' and the support bushing 52, and subsequently permitted to pass through the air gap formed between the support bushing 52 and the armature pushpin 40.

The flow diverter sleeve 50, 50' may be provided with various internal and external geometries that permit the flow diverter sleeve to deflect flow of a hydraulic fluid. In this regard, the flow diverter sleeve 50, 50' may include a deflector surface 76. In the approach shown in FIG. 2, the flange region 74 includes an outwardly expanding funnel-shaped wall forming a deflector surface 76. In the approach shown in FIG. 3, a deflector surface 76 is disposed between the second and third regions 82, 84 and extends in the general direction of the one or more fluid exhaust ports 66.

The deflector surface 76 extends at an angle in the general direction of the one or more fluid exhaust ports 66. The deflector surface 76 is therefore exposed to a flow path of hydraulic fluid entering the exhaust chamber 44 and deflects flow of the hydraulic fluid. The angle of the deflector surface 76 is preferably in the range of 10°-80°, and more particularly, in the range of 30°-60°. For example, an angle of 45° may sufficiently direct the flow of hydraulic fluid in the direction of the exhaust ports 66.

In some approaches, the flow diverter sleeve 50' is comprised of a valve region (e.g., first region 78) a shield region (e.g., third region 84), and a deflector surface deflector surface 76 extending between the valve region and the shield region.

In still other approaches (not shown), the armature pin may be integrally formed to include a flow diverter sleeve extending therefrom.

As shown in FIGS. 2 and 3, the flow diverter sleeve 50, 50' extends over at least an end portion of the support bushing 52 such that at least a portion of the flow diverter sleeve 50, 50' overlaps at least a portion of the support bushing 52. This may be accomplished, for example, by forming a flow diverter sleeve 50, 50' having an axial length sufficient to extend over at least a portion of the support bushing 52. For example, with reference to FIG. 2, the flow diverter sleeve 50 is preferably dimensioned (e.g., provided with sufficient axial length) such that at least the flange region 74 extends over an end portion of the support bushing 52 when the armature pushpin 40 is retracted to permit hydraulic flow into the exhaust chamber 44. The flow diverter sleeve 50 may further be dimensioned such that at least the flange region 74 extends over an end portion of the support bushing 52 throughout an entire stroke motion of the armature 36 and armature pushpin 40. With reference to FIG. 3, the third region 84 is preferably dimensioned (e.g., provided with sufficient axial length) to extend over an end portion of the support bushing 52 such that at least a portion of the third region 84 overlaps the end portion of the support bushing 52 when the armature pushpin 40 is retracted to permit hydraulic flow into the exhaust chamber 44. The flow diverter sleeve 50' may further be dimensioned such that the third region 84 overlaps the end portion of the support bushing 52 throughout an entire stroke motion of the armature 36 and armature pushpin 40.

The positioning of the flow diverter sleeve 50, 50' over the support bushing 52 prevents direct ingress of hydraulic fluid from the hydraulic chamber 60 into the support bushing 52. Instead, hydraulic flow passing through the exhaust chamber 44 is driven into contact with the deflector surface 76, which directs much of the flow toward the exhaust ports 66. Recirculating fluid (indicated as dashed lines in FIG. 2) is forced to turn around the deflector surfaces 76. In doing so, inertial forces propel the relatively high density contaminants 68 (having densities, for example, seven to eight times higher than the density of the hydraulic fluid) toward the exhaust ports 66 and out of the exhaust chamber 44. It will be appreciated that the flow diverter sleeve 50, 50' may take any shape, size, or positioning suitable for preventing direct ingress of hydraulic fluid into the support bushing 52 and/or for directing fluid flow toward fluid exhaust ports 66.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A solenoid valve comprising:
    a support bushing;
    an armature pin axially movable within the support bushing; and
    a valve rigidly secured to the armature pin, the valve including a diverter sleeve having
        an overlap portion radially spaced from and extending along a length of at least a portion of the support bushing, and
        a deflector surface disposed at an angle in a range of 30°-60° relative to a longitudinal axis of the armature pin.
2. The solenoid valve of claim 1, wherein the diverter sleeve is a discrete member rigidly secured to the valve.
3. The solenoid valve of claim 1, wherein the diverter sleeve is integrally formed with the valve.
4. The solenoid valve of claim 1, wherein the overlap portion of the diverter sleeve has an inner diameter greater than an outer diameter of at least a portion of the support bushing.
5. The solenoid valve of claim 1, wherein the overlap portion of the diverter sleeve overlaps at least a portion of the support bushing around an entire circumference of the support bushing.
6. The solenoid valve of claim 1, wherein the valve and the diverter sleeve are axially movable with respect to the support bushing.
7. The solenoid valve of claim 1, wherein the deflector surface extends at an angle generally toward an exhaust port of the solenoid valve.
8. The solenoid valve of claim 1, wherein the deflector surface is exposed in a flow path of a hydraulic fluid to deflect flow of the hydraulic fluid.
9. A solenoid valve comprising:
    a support bushing;
    an armature pin axially movable within the support bushing; and
    a valve rigidly secured to the armature pin, the valve including a diverter sleeve having an overlap portion having an inner circumference extending around an outer circumference of the support bushing and radially spaced from and extending along a length of at least a portion of the support bushing.
10. The solenoid valve of claim 9, wherein the diverter sleeve is a discrete member rigidly secured to the valve.
11. The solenoid valve of claim 9, wherein the diverter sleeve is integrally formed with the valve.
12. The solenoid valve of claim 9, wherein the inner circumference of the overlap portion of the diverter sleeve has an inner diameter greater than an outer diameter of the outer circumference of at least a portion of the support bushing.

13. The solenoid valve of claim 9, wherein the overlap portion of the diverter sleeve overlaps at least a portion of the support bushing around an entire circumference of the support bushing.

14. The solenoid valve of claim 9, wherein the valve and the diverter sleeve are axially movable with respect to the support bushing.

15. A solenoid valve comprising:
a support bushing;
an armature pin axially movable within the support bushing; and
a valve having a body rigidly secured to the armature pin, a diverter sleeve having a generally-cylindrical body extending from the body and spaced from the armature pin, and a flange extending from the generally-cylindrical body opposite the valve body at an angle relative to a longitudinal axis of the armature pin and defining a deflector surface.

16. The solenoid valve of claim 15, wherein an outer diameter of the deflector surface increases along an axial direction moving away from the valve body.

17. The solenoid valve of claim 15, wherein the deflector surface extends at an angle generally toward an exhaust port of the solenoid valve.

18. The solenoid valve of claim 15, wherein the deflector surface is exposed in a flow path of a hydraulic fluid to deflect flow of the hydraulic fluid.

19. The solenoid valve of claim 15, wherein the angle is in a range of 30°-60° relative to a longitudinal axis of the armature pin.

* * * * *